United States Patent

Koyama

Patent Number: 6,087,651
Date of Patent: Jul. 11, 2000

[54] HIGHLY SENSITIVE LIGHT RECEPTION ELEMENT

[75] Inventor: Koichi Koyama, Ninomiya-machi, Japan

[73] Assignee: Japan Science and Technology Corporation, Japan

[21] Appl. No.: 09/114,137

[22] Filed: Jul. 13, 1998

[30] Foreign Application Priority Data

Jul. 18, 1997 [JP] Japan ................... 9-194023

[51] Int. Cl.⁷ ................................. H01J 40/14
[52] U.S. Cl. ............................ 250/214.1; 257/431
[58] Field of Search ............. 250/214.1, 214 LS, 250/214 LA, 214 RC; 257/431, 458, 461

[56] References Cited

U.S. PATENT DOCUMENTS 4,119,840  10/1978  Nelson ................. 250/214.1

FOREIGN PATENT DOCUMENTS 3205520  5/1990  Japan.

OTHER PUBLICATIONS

Science, vol. 255, pp. 342–344, Jan. 17, 1992, Miyasaka et al. Quantum Conversion and Image Detection by a Bacteriorhodopsin Based Artificial Photoreceptor.

*Primary Examiner*—Que T. Le
*Attorney, Agent, or Firm*—Lorusso & Loud

[57] ABSTRACT

A highly sensitive light reception element includes a transparent electrode, an ion-conductive electrolyte, and a semiconductor electrode. In response to variation in quantity of light, the light reception element outputs a time-differentiated photoelectric response. The light reception element has high response speed and excellent stability.

13 Claims, 3 Drawing Sheets

F I G. 3
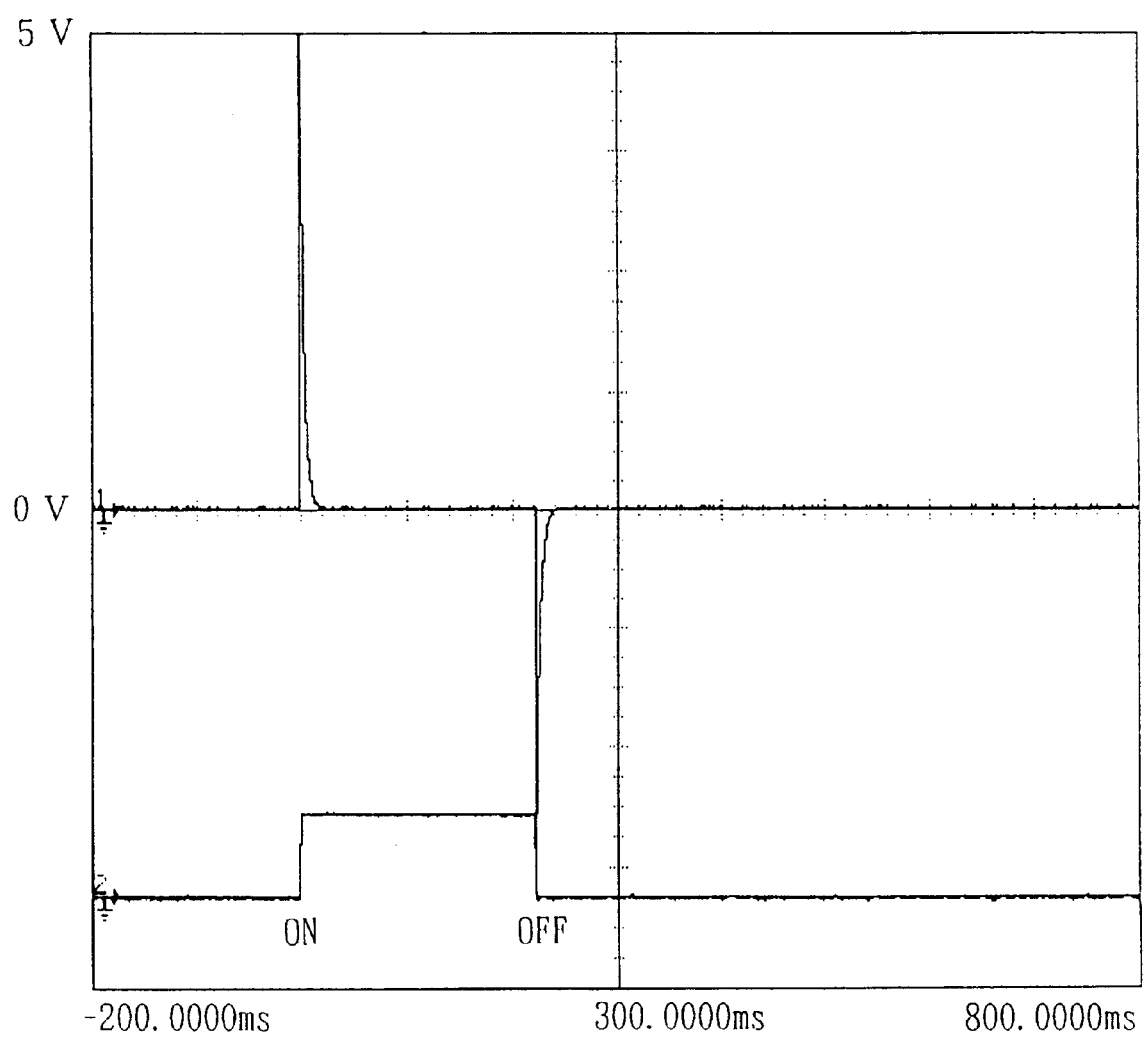

HIGHLY SENSITIVE LIGHT RECEPTION ELEMENT

BACKGROUND OF THE INVENTION

1. Field of the Invention

The present invention relates to a highly sensitive light reception element capable of converting variation in quantity of light into an electrical signal with high response speed.

2. Description of the Related Art

Conventionally, a light reception element that exhibits differential responsiveness has been developed in the form of an electrochemical cell having a layered structure of transparent electrode/bacteriorhodpsin thin film/electrolyte/ counter electrode (see Japanese Patent Application Laid-Open No. 3-205520 and Miyasaka, Koyama, and Itoh, Science 255, 342, 1992).

Such a light reception element is known as a first element that exhibits differential responsiveness in the level of the material thereof. Although the light reception element has various advantages, its extremely low sensitivity is its weakest point.

Further, there is anxiety about the reliability of the light reception element, because the light reception element utilizes a protein as a basic material.

FIG. 1 shows a response pattern of the conventional light reception element (which will be described later for comparison with the present invention in terms of effect).

SUMMARY OF THE INVENTION

An object of the present invention is to solve the above-mentioned problems and to provide a highly sensitive light reception element that has high response speed and excellent stability.

To achieve the above object, the present invention provides a highly sensitive light reception element which comprises a transparent electrode, an ion-conductive electrolyte, and a semiconductor electrode, wherein in response to variation in quantity of light, a time-differentiated photoelectric response is output.

Preferably, the semiconductor electrode is formed of silicon. The silicon may be n-type silicon or p-type silicon.

Preferably, the ion-conductive electrolyte is a solid electrolyte.

Preferably, the highly sensitive light reception element has a rising response speed of 20 $\mu$s or faster.

The present invention has the following advantageous effects.

(a) There can be provided a highly sensitive light reception element having a high response speed and excellent stability.

(b) Variation in quantity of light can be quickly converted into an electrical signal. At this time, the direction of output optical current can be changed through selection of an n-type silicon substrate or a p-type silicon substrate as an operative electrode.

(c) The light reception element can be constructed in the form of technologically useful elements such as an optical sensor, an optical switch, an artificial retina, or the like.

BRIEF DESCRIPTION OF THE DRAWINGS

FIG. 3 is a graph showing a response pattern of a highly sensitive light reception element according to the embodiment of the present invention in which an n-type silicon substrate is used.

DESCRIPTION OF THE PREFERRED EMBODIMENT

An embodiment of the present invention will next be described in detail with reference to the drawings.

Figure 2:
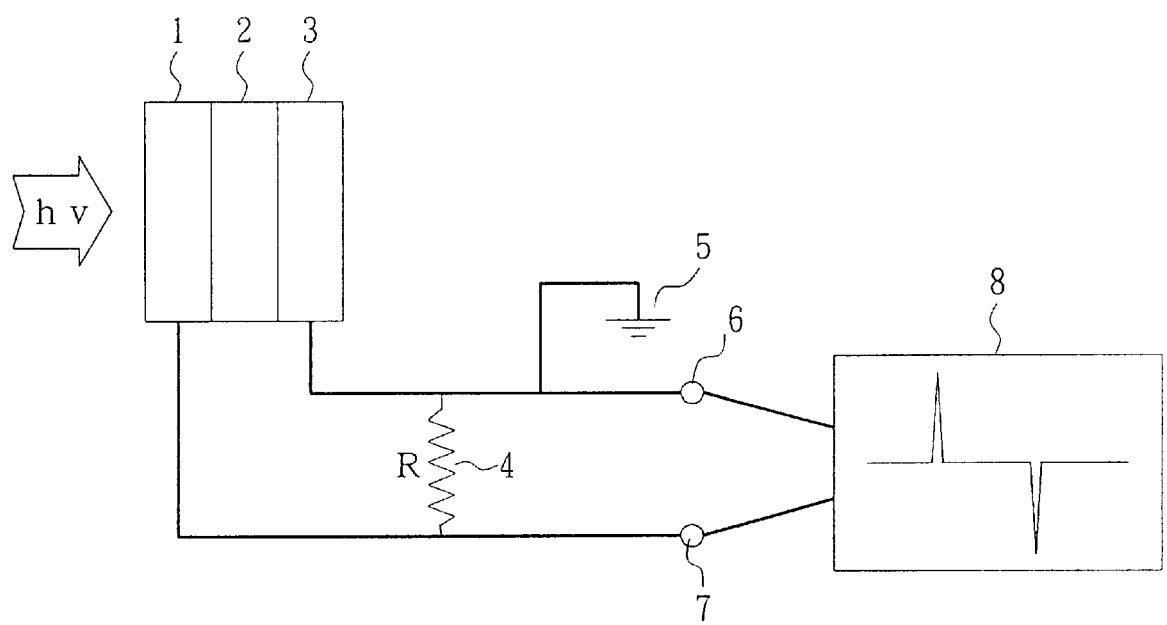
FIG. 2 is a view showing the structure of a highly sensitive light reception element according to an embodiment of the present invention.

FIG. 2 is a view showing the structure of a highly sensitive light reception element according to an embodiment of the present invention.

As shown in FIG. 2, the highly sensitive light reception element has a structure such that an ion-conductive electrolyte 2 is sandwiched between a transparent electrode 1 and a silicon electrode (silicon substrate) 3 serving as an operative electrode.

Between external terminals of the highly sensitive light reception element is connected a resistor 4 that adjusts the response speed of the light reception element. The response speed of the light reception element increases as the resistance of the resistor 4 decreases. Further, one external terminal connected to the silicon substrate 3 is connected to ground 5. An oscilloscope 8 is connected to output ends 6 and 7 of the external terminals.

When visible light was radiated onto the highly sensitive light reception element having the above-described structure such that the light reception element receives the light from the side of the transparent electrode 1, the external circuit detects a high-speed rising of photoelectric current, the level of which then returns to zero. When irradiation of light is stopped, the direction of the photoelectric current reverses, and the level of the photoelectric current then returns to zero. In other words, the light reception element exhibits a time-differentiated response.

When an n-type silicon substrate is used as the silicon electrode 3, photoelectric current flows toward the anode upon irradiation of light. In other words, electrons move from the ion-conductive electrolyte 2 into the silicon electrode 3 upon irradiation of light, and move from the silicon electrode 3 into the ion-conductive electrolyte 2 when irradiation of light is stopped.

When a p-type silicon substrate is used as the silicon electrode 3, the light reception element operates in the reverse manner. That is, photoelectric current flows toward the cathode upon irradiation of light. In other words, electrons move from the silicon electrode 3 into the ion-conductive electrolyte 2 upon irradiation of light, and move from the ion-conductive electrolyte 2 into the silicon electrode 3 when irradiation of light is stopped.

EXAMPLES

A two-electrode type electrochemical cell shown in FIG. 2 was constructed through use of $SnO_2$ as the transparent electrode 1, 0.1 mol of KCl (NaCl or the like may alternatively be used) as the ion-conductive electrolyte 2, and an n-type silicon substrate as the silicon electrode 3. The thickness of the ion-conductive electrolyte 2 was set to 1 mm. Xenon light (150 W) was caused to pass through an IR (infrared ray) cut filter and a yellow filter (HOYA Y48) and irradiated the cell for 0.25 seconds.

FIG. 3 shows a response pattern of the highly sensitive light reception element according to the embodiment of the present invention in which an n-type silicon substrate is used.

Figure 1:
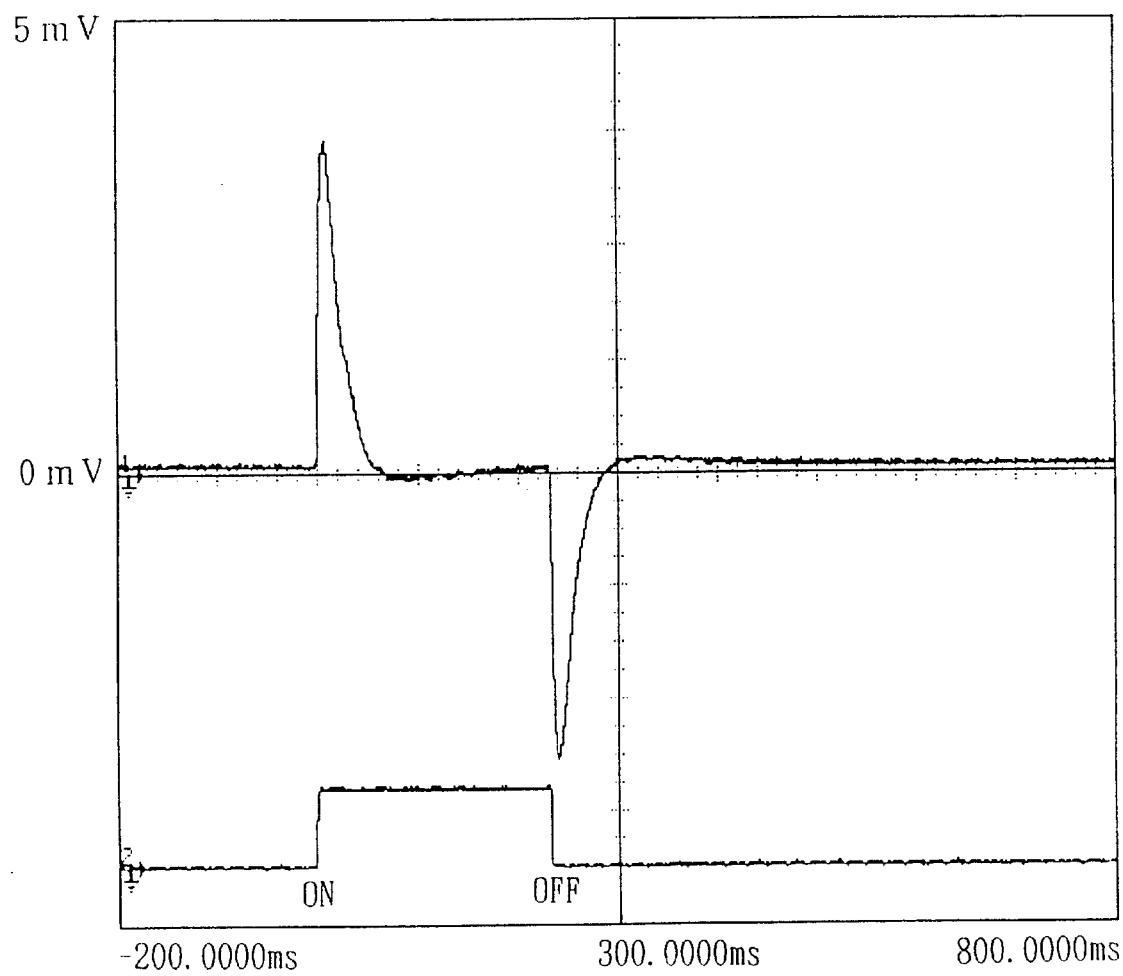
FIG. 1 is a graph showing a response pattern of a conventional light reception element.

As is apparent from FIG. 3, the highly sensitive light reception element of the present invention has a response sensitivity that is several thousands times that of the conventional light reception element shown in FIG. 1 (the unit for the vertical axis in FIG. 3 is volt, whereas the unit for the vertical axis in FIG. 1 is millivolt). Further, since all the layers of the light reception element of the present invention are formed of inorganic materials, the light reception element has excellent stability.

As described above, in the present invention, since the silicon electrode 3 is used as an operative electrode, the light reception element of the present invention has a sensitivity at least one-thousand times that of the conventional light reception element and a response speed at least ten times that of the conventional light reception element.

A further detailed description will now be given of the electrode. Any of various kinds of precious metals (e.g., Au, Pt) and electrically conductive metallic oxides (e.g., $SnO_2$, $In_2O_2$, $RuO_2$) are preferably used for the transparent electrode. Among them, thin film of Au or Pt (having a thickness of 1000 angstroms or less) or thin film of $SnO_2$, $In_2O_2$, or composite material thereof (ITO) are more preferred from the viewpoint of light transmissiveness. Among them, $SnO_2$ and ITO are most preferably used because of their high chemical stability as electrode materials and high S/N ratio of light-response current, as well as high light transmissiveness.

$SnO_2$ and ITO preferably have an electric conductivity of $10^2 \, \Omega^{-1} \, cm^{-1}$ or greater, more preferably, $10^3 \, \Omega^{-1} \, cm^{-1}$ or greater. These electrically conductive electrode materials are formed in the form of thin film on a transparent support formed of glass or resin through vacuum deposition or spattering. The thin film preferably has a thickness of 100–10000 angstroms, more preferably 500–6000 angstroms.

Next, a description will be given of the electrolyte. Examples of the electrolyte used as an ion-conductive medium in the present invention include electrolytic solution and solid electrolyte formed of an inorganic material or a organic polymer material. The electrolytic solution is an aqueous solution containing supporting salt. Examples of the supporting salt include KCl, NaCl, $K_2SO_4$, $KNO_2$, LiCl, and $NaClO_4$.

The concentration of the supporting salt is generally in the range of 0.01 mol/l–2 mol/l, and is preferably in the range of 0.05 mol/l–1 mol/l. A polymer electrolyte containing an organic polymer material as a medium is preferably used as the solid electrolyte. For example, as the solid electrolyte there is used a polymer electrolyte whose medium is formed of gelatin, agar, polyacrylamide, polyvinyl alcohol, general-purpose cation or anion exchange resin, or a mixture of these materials, and which contains a supporting salt as an ion carrier and water if needed.

Also, in addition to $H^+$—$WO_3$ system, $Na^+$—$\beta$—$Al_2O_3$ system, $K_2$—ZnO system, and non-oxide materials such as $PbCl_2$/KCl and $SnCl_2$ can be used as the solid electrolytem, there can be used a polymer electrolyte whose medium is formed of gelatin, agar, polyacrylamide, polyvinyl alcohol, or general-purpose cation or anion exchange resin and which contains a salt as an ion carrier.

In the above-described embodiment, a two-electrode type is exemplified. However, the light reception element of the present invention may include a reference electrode as the third electrode element if needed. In this case, the reference electrode is inserted into the ion-conductive electrolyte.

In this case, a voltage may be externally applied between the reference electrode and the operative electrode or between the reference electrode and the transparent electrode. For the three-electrode type cell, there is used an external circuit setup including a current measurement apparatus. A controlled potential electrolysis device (potentiostat) is one example of such a setup.

When the third electrode is used, a silver/silver chloride electrode, mercury chloride electrode, or saturated calomel electrode is used as the third electrode. Among them, a silver/silver chloride electrode is preferably used in order to reduce the size of the element. The counter electrode and the reference electrode may have a shape of thin film, substrate, or a small probe.

The response profile could be reproduced without any attenuation after a few thousand times of exposure to light. The spectrum of the response was measured by dispersing light from a light source by use of a band-pass filter. The results show that the light reception element of the present invention has a strong response throughout the entire visible light range of about 400–700 nm.

The rising response speed of the light reception element of the present invention is very high, and rising time becomes 20 $\mu$s or less.

The highly sensitive light reception element of the present invention has a function of quickly converting variation in quantity of light into an electrical signal and can be constructed in the form of technologically useful elements such as an optical sensor, an optical switch, an artificial retina, or the like.

Needless to say, an amplifier, a waveform shaper, or the like may be added to the external circuit of the highly sensitive light reception element if needed.

The present invention is not limited to the above-mentioned embodiment. Numerous modifications and variations of the present invention are possible in light of the spirit of the present invention, and they are not excluded from the scope of the present invention.

What is claimed is:

1. A highly sensitive light reception element comprising:
   (a) a transparent electrode;
   (b) an ion-conductive electrolyte; and
   (c) a semiconductor electrode formed of silicon, wherein
   (d) in response to variation in quantity of light, a time-differentiated photoelectric response is output.

2. A highly sensitive light reception element according to claim 1, further comprising means for detecting photoelectric current connected between a terminal of said transparent electrode and a terminal of said semiconductor electrode.

3. A highly sensitive light reception element according to claim 1, wherein said silicon is n-type silicon.

4. A highly sensitive light reception element according to claim 1, wherein said silicon is p-type silicon.

5. A highly sensitive light reception element according to claim 1, wherein said ion-conductive electrolyte is a solid electrolyte.

6. A highly sensitive light reception element according to claim 1, wherein said highly sensitive light reception element has a rising response speed of at least 20 $\mu$s.

7. A highly sensitive light reception element according to claim 1, wherein said transparent electrode is a precious metal or electrically conductive metallic oxide.

8. A highly sensitive light reception element according to claim 1, wherein said transparent electrode is a thin film of an electrically conductive metallic oxide selected from the group consisting of $SnO_2$, $In_2O_2$, $RuO_2$ and a composite of $SnO_2$ and $In_2O_2$.

9. A highly sensitive light reception element according to claim 1, wherein said transparent electrode is a thin film of Au or Pt.

10. A highly sensitive light reception element according to claim 1, wherein said thin film has a thickness of 100–1000 angstroms.

11. A highly sensitive light reception element according to claim 1, wherein said ion-conductive electrolyte is formed as a layer sandwiched between said transparent electrode and said semiconductor electrode.

12. A highly sensitive light reception element according to claim 11, wherein said transparent electrode is a thin film and said semiconductor electrode is a substrate.

13. A highly sensitive light reception element according to claim 2, further comprising a resistor connected between said terminals for adjusting the response speed of the light reception element.

* * * * *